Dec. 29, 1959 J. J. SCHOCH 2,918,790
GAS TURBINE POWER PLANT SYSTEM
Filed Nov. 25, 1955
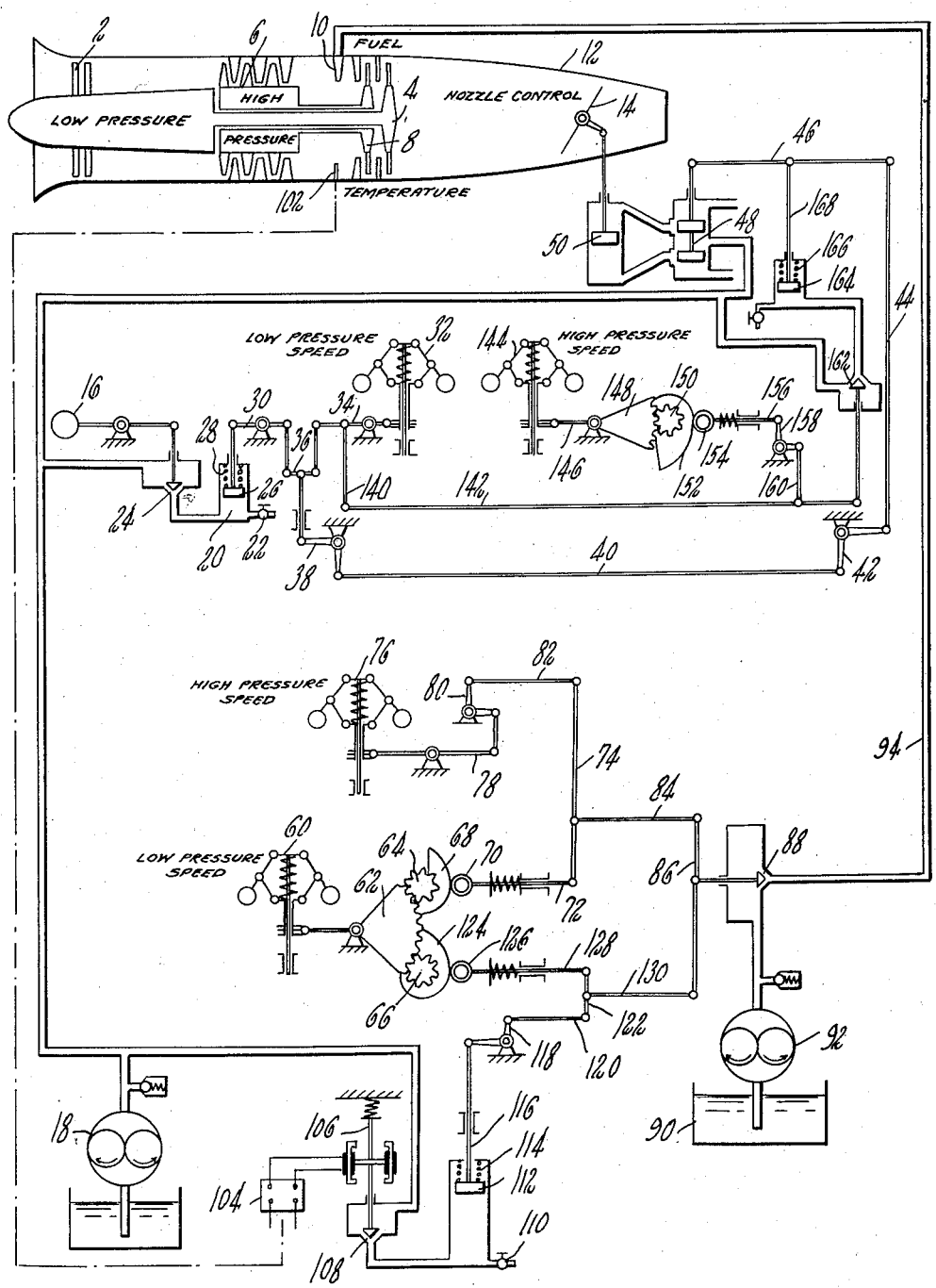

United States Patent Office 2,918,790
Patented Dec. 29, 1959

2,918,790

GAS TURBINE POWER PLANT SYSTEM

Jacques J. Schoch, Washington, D.C., assignor to Grovar, Incorporated, Washington, D.C., a corporation of Delaware Application November 25, 1955, Serial No. 548,803

10 Claims. (Cl. 60—35.6)

This invention relates to gas turbine power plant systems, for example, to turbo-jet power plant systems in which the power plant is of the variable area nozzle type or the like, such as are used in aircraft.

With gas turbine power plant systems, it is desirable that the gas turbine power plant be operated at as high efficiency as possible, since it is known that fuel consumption rises if the turbine is not so operated. However, the most efficient operation of a turbine power plant frequently takes place in a region of turbine operating characteristics close to that region in which the phenomena of "compressor surge" takes place, such "compressor surge" resulting in a completely uncontrolled operation of the gas turbine power plant which frequently causes structural failure.

Accordingly, it is an object of the present invention to provide a gas turbine power plant control system which will permit operation of a turbine in a region closely adjacent to the region of "compressor surge," thus resulting in greatly increased efficiency and lower fuel consumption, even with gas turbine power plant systems wherein the engine operating characteristics to be controlled, such as turbine speed and turbine inlet temperature, for example, exceed the number of directly controllable engine variables, such as fuel flow and tailpipe nozzle area, for example.

It is an important feature of the invention that, by its use, thrust changes may be made without any danger of entering the "compressor surge" region of turbine operating characteristics.

For the purpose of fully describing a preferred embodiment of the invention, reference is now made to the following specification together with the accompanying drawing which is a diagrammatic view of a gas turbine power plant control system embodying the invention.

The invention may be used with any one of a number of types of gas turbine power plants known to the art, that shown in the drawing being of the type known as a dual spool turbo-jet power plant which consists essentially of a low pressure compressor 2 driven by a low pressure turbine 4, forming the low pressure spool 2, 4, in cooperating arrangement with a high pressure compressor 6 driven by a high pressure turbine 8 forming the high pressure spool 6, 8. In such a turbine power plant, atmospheric air enters the low pressure compressor 2 where it is compressed to some desired pressure. The compressed air then enters the high pressure compressor 6 where it is further compressed. The compressed air then passes to the combustion chamber where fuel is introduced through a fuel nozzle 10 and is burned in the compressed air to attain a desired turbine inlet temperature. The combustion gases and excess air are then partially expanded in the high pressure turbine 8 to provide the energy to drive the high pressure compressor 6, further expanded through the low pressure turbine 4 to drive the low pressure compressor 2, and then finally expanded to atmosphere through the tailpipe or exhaust nozzle 12, to provide some energy which is available as propulsive thrust for driving an aircraft, for example.

The tailpipe or exhaust nozzle 12 is of the usual type having a controllable variable exhaust area, herein represented schematically as a simple butterfly valve 14. The nozzle area may be controlled manually by the pilot or otherwise by means of an operating or input lever 16, which, by controlling the oil flow from the pump 18 through the actuator cylinder 20 and the orifice 22 by means of a pilot valve 24, imposes a force upon the actuator piston 26, which, by means of the spring 28, causes a displacement at the end of the linkage 30 proportional to the speed desired by the pilot. The conventional flyball speed sensing device 32 senses the rotational speed of the low pressure spool 2, 4 and provides a displacement proportional to the low pressure spool speed to the end of the linkage 34. The two signals, i.e., the desired speed signal available from linkage 30 and the actual speed signal available from the linkage 34 are compared by the comparison generator arm 36. An error between actual low pressure spool speed and desired low pressure spool speed will result in an error signal in the form of a proportional disspplacement into the bell crank 38. Such displacement is transmitted through the link 40, bell crank 42, link 44, and comparison generator arm 46 (neglecting for the moment the effect of movement of link 168), and results in a displacement of the pilot valve 48. This will result in either admitting servo fluid to the top side of the actuator piston 50 and draining from the bottom side, or vice versa, in either case effecting a change in the area of the turbine exhaust nozzle 12 by manipulation of the butterfly valve 14. As a result, any low pressure spool speed error resulting either from the power plant or the pilot will cause the tailpipe or exhaust nozzle area to change until the low pressure compressor speed error is reduced to zero. Such controllable exhaust nozzles using the speed control means above described are well understood in the aircraft power plant system art and need not herein be further explained.

A heretofore known control system for such a power plant consisted of a speed control mechanism of the type described above as well as either a turbine inlet temperature control or a high pressure spool speed control. In either case, fuel flow was manipulated to attain the desired result. Such temperature control, for example, consisted of a temperature sensing device, the output of which was compared to a desired temperature and the fuel flow manipulated until such time as the error between desired temperature and actual temperature is reduced to zero. An alternate method was to sense the high pressure spool speed, compare it to a desired high pressure spool speed and manipulate the fuel flow until such time as the error between desired high pressure spool speed and actual high pressure spool speed was reduced to zero. With such a system, however, the fuel flow could only be used alternatively for the control of one of the latter two engine operating characteristics noted, that is either for the control of turbine inlet temperature or high pressure spool speed, but not both. Thus, it permitted at least one degree of freedom during a transient over which no control was exercised, that particular engine operating characteristic, either turbine inlet temperature or high pressure spool speed, being substantially uncontrolled and only varying by reason of its inherent internal relationships with the two engine operating characteristics being controlled, that is, low pressure spool speed and either turbine inlet temperature or high pressure spool speed.

It is conventional practice to relate a plurality of engine operating characteristics in such a manner as to attain a proper combination thereof to provide optimum engine performance by means of arrangements such that each desired engine operating characteristic as affected by its related directly controllable engine variable bears a desired relation to the other engine operating characteristics as affected by their related directly controllable engine variable, i.e., the inputs to the system are properly related to attain a given steady state operating relation. However, whether two engine operating characteristics only are controlled, with reliance on the internal relationship between such two and another for attainment of a given operating relationship, or whether all are directly controlled, the given operating relationship being accomplished by properly selecting the inputs in each case, the actual values of the engine operating characteristics during a transient power output change will be only remotely related due to inertia of the system, for example, of the spools, as well as for other reasons.

As to the above described example embodying speed-temperature control, assume an initial steady state condition defined by a given exhaust nozzle area and fuel flow which results in an inherent internal relationship of low pressure spool speed, high pressure spool speed and turbine inlet temperature. If a higher thrust was desired, the pilot, by simultaneously operating the low pressure spool speed control input and the temperature control input, could attain a thrust output with some desired relationshsip between low pressure spool speed and turbine inlet temperature with a consequential steady state high pressure spool speed. In such a case, the input to both controls could be accomplished simultaneously by establishing the desired relationship between two of the three variables, in this example, low pressure spool speed and turbine inlet temperature, on suitable input cams, but there remained no control of the high pressure spool speed during the transient condition and it was, in effect, uncontrolled until the steady state operating condition was again reached. Thus, although such a system permitted the control of the overall power plant system in accordance with any arbitrarily selected operating line, it in no way defined the transient characteristics and thereby readily permitted combinations of low pressure spool speed, high pressure spool speed and turbine inlet temperature during a transient which could cause "compressor surge" for either or both compressors.

According to my invention, I employ gas turbine power plant system control means, for example, including function generators of mechanical or other type, responsive to changes in selected turbine power plant operating characteristics to maintain a predetermined relationship between them by controlling the turbine operating control as well as the directly controllable engine variables. The turbine power plant operating characteristics which may be employed for its control, are, for example, turbine spool speeds, turbine inlet temperatures, turbine pressure differentials and combinations thereof, which characteristics are varied by changes in, for example, turbine fuel flow or turbine load as by a variable area tailpipe or otherwise. Thus, the turbine power plant system, which term is intended to include the turbine-load system, comprising the turbine and its controls as well as factors other than normal operating controls which affect the load thereon, is automatically controlled in accordance with a desired relationship during transient as well as steady state operation, and such control is effected even with a turbine having fewer directly controllable engine variables than engine operating characteristics controlled thereby, such as, for example, is the case with the dual spool type of turbine herein described which has but two engine variables and three engine operating characteristics to be controlled thereby.

Particularly with such type of turbine power plant system, I have, for the first time, made possible the elimination of any encroachment into the "compressor surge" region during transient operation, while at the same time, permitting turbine power plant operation closely adjacent thereto for optimum efficiency.

Referring again to the drawing, a conventional flyball speed sensing device 60 is driven through suitable gears by the low pressure spool 2, 4 and provides a speed sensing device for said spool, which speed is a typical turbine operating characteristic which may be selected for its control. Movement of the sleeve of such flyball sensing device (which movement is proportional to the speed of the low pressure spool) is transmitted through a suitable linkage to the toothed quadrant member 62, which engages two rotatably mounted pinions 64 and 66. A cam 68 mounted on a common shaft with pinion 64 is provided as a function generator, such cam defining a desired predetermined relationship between the low pressure spool speed and the high pressure spool speed as a second turbine power plant operating characteristic to provide a desired operating relationship between such selected operating characteristics so that movement of the cam follower 70 associated with such cam 68 is in terms of the high pressure spool speed of said power plant. Such movement provides an output which is transmitted from cam follower 70 through the linkage 72 to one end of a comparison generator arm 74.

The other end of the comparison generator arm 74 receives an output in the form of a movement which is proportional to the actual high pressure spool speed and which is derived from the flyball speed sensing unit 76. Said sensing unit 76 is driven through suitable gears by the high pressure spool 6, 8 and the movement proportional to the high pressure spool speed is transmitted through the linkage 78, the bell crank 80 and the linkage 82 to comparison generator arm 74. It may be seen that if the actual high pressure spool speed, which output is available by movement of the linkage 82, is in excess of the high pressure spool speed computed from the low pressure spool speed output available as a movement of the linkage 72, then the center of the comparison generator arm 74 will move to the right, as shown on the drawing, to continuously quantitatively provide a combined or error signal output and through linkage 84 and linkage 86 (which is also available for another purpose hereinafter described), the fuel valve 88 will close, reducing the fuel flow pumped from reservoir 90 by pump 92 through pipe 94 to the fuel nozzle 10.

A parallel system related to the control of turbine inlet temperature also influences the fuel flow by means of the comparison generator arm 86 and the fuel valve 88. Specifically, the turbine inlet temperature is sensed by thermocouple 102, the output of which is amplified by amplifier 104 and fed to a positioning solenoid 106 which directly controls the position of the pilot valve 108. The position of pilot valve 108 in conjunction with the orifice 110, determines the pressure acting against the piston 112, the force available as determined by said pressure acting upon a given piston area being balanced by the spring 114 causing a displacement of the linkage 116 which is proportional to the actual turbine inlet temperature. This movement is transmitted through the bell crank 118 and the linkage 120 to one end of the comparison generator arm 122.

The low pressure spool speed sensing device 60 which transmits a movement proportional to the low pressure spool speed to the toothed quadrant member 62 is also available for the computation of a corresponding turbine inlet temperature consistent with the desired operating relationships between engine characteristics. For this purpose, the toothed quadrant member 62 engages the second rotatably mounted pinion 66 which is mounted upon a common shaft with the cam or function generator 124 which provides the desired relationship between low pressure spool speed and turbine inlet temperature. Thus, the displacement of the cam follower 126 will be proportional to a turbine inlet temperature computed from the actual low pressure spool speed and corresponding to a desired relationship between the two engine operating characteristics. This displacement is transmitted through the linkage 128 to the comparison generator arm 122 where it is compared to the actual turbine inlet temperature output or movement available from linkage 120. Should the actual temperature be in excess of that computed from the low pressure spool speed, the center of the linkage 122 will move to the right as shown in the drawing to provide a combined or error signal output to move link 130 and arm 86, reducing fuel flow to the engine. Should the actual temperature be less than that computed as desired, as will be the case with an accelerating low pressure spool, cam 124 will move counterclockwise, causing a movement to the left as shown in the drawing of linkage 128 to provide a combined error signal output of a resultant movement to the left to open the fuel valve 88.

Thus, one of the two directly controlled engine variables, fuel flow, is used for the control of two engine operating characteristics, high pressure spool speed and turbine inlet temperature, indirectly controlled thereby, said engine variable in turn being controlled by two different pairs of the three engine operating characteristics. The other directly controlled engine variable, the tailpipe or exhaust nozzle area, is controlled by a single pair of engine operating characteristics as well as by the turbine operating control lever 16, as hereinafter explained.

Referring again to the low pressure spool speed sensing device 32 from which a displacement proportional to said speed is available in linkage 34, such proportional displacement is made available through linkage 140 to one end of the comparison generator arm 142. A second high pressure spool speed sensing device 144 provides a movement to linkage 146 which is proportional to the high pressure spool speed and which is transmitted to the toothed quadrant member 148. A pinion 150 engaged with the toothed quadrant member 148 is mounted upon a common shaft with a function generator or cam 152, which function expresses a desired relationship between high pressure spool speed and low pressure spool speed. The output of cam 152 by displacement of the cam follower 154 and the linkage 156 is proportional to a predetermined desired low pressure spool speed as a function of the high pressure spool speed. This movement is transmitted through the bell crank 158 and the linkage 160 to the comparison generator arm 142 wherein it is compared to the actual low pressure spool speed. If the actual low pressure spool speed is in excess of that computed from the high pressure spool speed, the right end of the comparison generator arm 142 as shown in the drawing will rise, closing the pilot valve 162, thereby reducing the pressure acting against piston 164. As a result, the spring 166 will force the piston 164 and the linkage 168 downward and a displacement proportional to the error between desired and actual low pressure spool speed will be introduced to the comparison generator arm 46, causing the pilot valve 48 to move downward and thereby introduce servo fluid to the bottom of piston 50 which will cause it to rise and tend to close the exhaust nozzle valve 14. The consequent reduced pressure drop available across the low pressure spool turbine will then decrease the rotational speed of the low pressure spool.

In operation, the introduction of an upset by the pilot through operating lever 16, calling for more thrust will result in the pilot valve 48 introducing servo fluid to the top of the piston 50 thereby increasing the exhaust nozzle area and accelerating the low pressure spool 2,4. Simultaneously, the low pressure spool speed sensing unit 60 accelerates, calling for a higher high pressure spool speed and a higher turbine inlet temperature through function generators 68 and 124 respectively. In both cases, the result will be an increase in fuel flow modulated by the actual values of high pressure spool speed and turbine inlet temperature available through their respective sensing and translation units through linkages 84 and 130 respectively. Without more, however, the high pressure spool acceleration is dependent on the internal relationships as well as its inertia, while the displacement of linkage 130 or the turbine inlet temperature error signal available for control purposes is dependent on the time constant of the temperature sensing device 102 and the transducing means utilized to derive a proportional displacement therefrom. These two signals available in linkages 84 and 130 can be weighted or delayed as required for proper manipulation of the fuel valve by applying a control as above described to completely relate the three engine operating characteristics. This is done by means of the control of the effect of operating lever 16 which is effective to prevent a low pressure spool transient from taking place independently of the other engine operating characteristics. This is due to the fact that the low pressure spool acceleration is limited or controlled by the acceleration of the high pressure spool by comparison with a corresponding low pressure spool speed output signal available from function generator 150 through to linkage 168. Accordingly, if upon initially upsetting the system by means of operating lever 16 manipulation of the fuel valve 88 by its controls will not permit the high pressure spool speed and turbine inlet temperature values to keep closely enough apace with the more rapidly accelerating low pressure spool, then the acceleration of the low pressure spool is reduced by, in effect, referring back to the progress of the high pressure spool speed by means of the portion of the system affected by high pressure spool speed sensing device 144. The result is that link 168 will act to slow the acceleration of the low pressure spool should it get too far in advance of the high pressure spool speed. This is accomplished by comparison generator arm 46 which subtracts the error output available at linkage 168 between the low pressure spool speed computed from the high pressure spool speed at linkage 160 and its actual value at linkage 140 from the input resulting from the error output available at linkage 44 between actual low pressure spool speed at linkage 34 and that desired by the pilot at linkage 30. Since all three engine operating characteristics are thus interrelated by a given desired relationship, the accomplishment of a transient power or thrust charge can be accomplished with minimum departure from the relationship.

It should be noted that the magnitude of departure from a desired operating relationship can be controlled by introducing time lags as required for a given power plant. For example, if all sensing and manipulation elements acted in zero time, no transient could take place. This may be seen by assuming that the introduction of a positive upset into operating lever 16, which should start to accelerate the low pressure spool by opening 14, will also result in the displacement of link 140 downward. If the high pressure spool has not yet accelerated, the increased low pressure spool speed available as a downward movement of 140 will close valve 162 causing a downward motion of linkage 168, thereby substracting from the initial input into valve 48 by movement of link 44. As a result, if the subtraction takes place instantaneously, no transient can take place. Thus, it is only by introducing a time lag into the subtraction process, as by the elements of the mechanism, including valve 162, piston 164, and spring 166, that a transient is permitted to take place. Such time lag can be controlled by the selection of the area of piston 164, for example, thereby providing, for example, close adherence to the desired engine operating curve with a slow transient as is the case with a small piston area 164, or a faster transient with larger divergence from the desired relationship with a bigger time lag as is the case with a large piston area.

Thus it will be seen that by my invention I am enable to control a turbine power plant system having fewer directly controllable engine variables than engine operating characteristics to be controlled thereby through the control of one of said directly controllable engine variables to automatically attain any predetermined operating relationship between selected power plant system operating characteristics.

Other applications of my invention to various types of gas turbine power plant systems as well as further modifications within the spirit of my invention and the scope of the appended claims will be apparent to those skilled in the art.

I claim:

1. In a gas turbine power plant system, a gas turbine power plant having at least one directly controllable engine variable for directly controlling the performance thereof and a plurality of selected engine operating characteristics at least one more than said variable indirectly controlled thereby, a plurality of sensing means operatively connected to said turbine power plant for sensing changes in said selected operating characteristics of said turbine power plant, and means for controlling at least said one directly controllable engine variable in accordance with a predetermined operating relationship between said engine operating characteristics including operating means providing an output for changing the performance of said power plant by directly varying said engine variable while maintaining said engine operating characteristics within a predetermined departure from said operating relationship during said change by providing means operatively connected to said operating means and one of said sensing means for continuously quantitatively comparing said output and one of said selected operating characteristics to provide a first error signal output, means operatively connected to said sensing means responsive to changes in said selected operating characteristics to maintain a predetermined relationship between said selected operating characteristics to provide a second error signal output, and means for continuously quantitatively comparing said first and second error signal outputs to control said one directly controllable engine variable.

2. In a gas turbine power plant system, a gas turbine power plant having at least one directly controllable engine variable for directly controlling the performance thereof and a plurality of selected engine operating characteristics at least one more than said variable indirectly controlled thereby, a plurality of sensing means operatively connected to said turbine power plant for sensing changes in said selected operating characteristics of said turbine power plant, and means for controlling at least said one directly controllable engine variable in accordance with a predetermined operating relationship between said engine operating characteristics including operating means providing an output for changing the performance of said power plant by directly varying said engine variable while maintaining said engine operating characteristics within a predetermined departure from said operating relationship during said change by providing first comparison generator means for continuously quantitatively comparing the output of said operating means and one of said sensing means to provide a first combined output, function generator means defining said desired predetermined relationship between two of said selected operating characteristics and connected to one of said sensing means to provide an output in terms of the output of a second of said sensing means, second comparison generator means for continuously quantitatively comparing the output of said function generator means with the output of said second sensing means to provide a second combined output, and third comparison generator means for continuously quantitatively comparing said first and second combined outputs to control said controllable engine variable.

3. In a gas turbine power plant system, a gas turbine power plant having a plurality of directly controllable engine variables for directly controlling the performance thereof and a plurality of selected engine operating characteristics at least one more than said variables indirectly controlled thereby, sensing means for sensing each of said selected engine operating characteristis, means for controlling a first of said variables connected to said sensing means and to said first variable for directly varying said first variable in accordance with a predetermined operating relationship between said engine operating characteristics by providing an error signal output from each of two different pairs of said selected engine operating characteristics by comparing with one another in terms of said relationship the two sensed operating characteristics of each pair and comparing said two error signal outputs to provide a combined error signal output effective directly to control said first variable and means for controlling a second of said variables including manual operating means for changing the performance of said power plant by directly varying said second variable while maintaining said engine operating characteristics within a predetermined departure from said operating relationship during said change in performance by providing a first error signal output from said manual operating means and one of said selected sensed operating characteristics, and a second error signal output from one of said pairs of said selected engine operating characteristics by continuously quantitatively comparing with one another in terms of said relationship the two sensed operating characteristics of said one pair and continuously quantitatively comparing said first and second error outputs to provide a combined error signal output effective directly to control said second variable.

4. In a gas turbine power plant system as claimed in claim 3, wherein said means for controlling the first of said directly controllable engine variables includes first function generator means defining said desired predetermined relationship between a first two of said selected operating characteristics and operatively connected to one of said sensing means to provide an output in terms of the output of a second of said sensing means, and a first comparison generator means for continuously quantitatively comparing the output of said first function generator means with the output of said second of said sensing means to provide a first combined output from one of said pairs, second function generator means defining said desired predetermined relationship between a second two of said selected operating characteristics and operatively connected to one of said sensing means to provide an output in terms of a second of said sensing means, and a second comparison generator means for continuously quantitatively comparing the output of said second function generator means with the output of the latter second of said sensing means to provide a second combined output from another of said pairs, and third comparison generator means for continuously quantitatively comparing said first and second combined outputs to control said first directly controllable engine variable, and said means for controlling a second of said directly controllable engine variables includes fourth comparison generator means for continuously quantitatively comparing the output of said operating means and one of said sensing means to provide a fourth combined output, third function generator means defining said desired predetermined relationship between said selected operating characteristics and connected to one of said sensing means to provide an output in terms of the output of a second of said sensing means, fifth comparison generator means for continuously quantitatively comparing the output of said third function generator means with the output of the latter second of said sensing means to provide a fifth output, and sixth comparison generator means for continuously quantitatively comparing said fourth and fifth combined outputs to control said second directly controllable engine variable.

5. A gas turbine power plant system as claimed in claim 3 wherein one of said directly controllable engine variables is fuel flow.

6. In a gas turbine power plant system as claimed in claim 3 further including time delay means establishing said predetermined departure.

7. In a gas turbine power plant system as claimed in claim 3 wherein said means for controlling each of said variables includes function generator means defining said desired predetermined relationship connected to one of said sensing means of each said pair for continuously quantitatively comparing of said sensed operating characteristics with one another in terms of said relationship.

8. In a gas turbine power plant system, a turbo-jet power plant having a variable fuel input and a variable area tailpipe nozzle for directly controlling the thrust thereof and for indirectly controlling three selected engine operating characteristics, sensing means for sensing each of said selected engine operating characteristics, fuel flow control means connected to said sensing means and to said variable fuel input for directly varying the fuel input in accordance with a predetermined operating relationship between said engine operating characteristics by providing an error signal output from each of two different pairs of said three selected engine operating characteristics by comparing with one another in terms of said relationship the two sensed operating characteristics of each pair and comparing said two error signal outputs to provide a combined error signal output effective directly to control said variable fuel input, and tailpipe nozzle control means including manual operating means for changing the thrust of said power plant by directly varying the tailpipe nozzle area while maintaining said engine operating characteristics within a predetermined departure from said operating relationship during said change in thrust, by providing a first error signal output from said manual operating means and one of said selected sensed operating characteristics, and a second error signal output from one of said pairs of said three selected engine operating characteristics by continuously quantitatively comparing with one another in terms of said relationship the two sensed operating characteristics of said one pair and continuously quantitatively comparing said first and second error signal outputs to provide a combined error signal output effective directly to control the area of said nozzle.

9. In a gas turbine power plant system as claimed in claim 8 wherein said turbo-jet power plant is of the dual spool type having a variable fuel input and a variable area tailpipe nozzle for directly controlling the thrust thereof and for indirectly controlling the speeds of each said spool and the turbine inlet temperature as said selected engine operating characteristics, and said sensing means for sensing each of said selected operating characteristic senses each of said speeds and said temperature.

10. In a gas turbine power plant as claimed in claim 9 wherein said fuel flow control means includes a first function generator means defining said desired predetermined relationship between one of said speeds and said temperature and operatively connected to one of said sensing means to provide an output in terms of the other of said sensing means and a first comparison generator means for continuously quantitatively comparing the output of said first function generator means and said other of said sensing means to provide a combined output from one of said pairs, second function generator means defining said desired predetermined relationship between said speeds and operatively connected to one of said speed sensing means to provide an output in terms of the output of the other of said speed sensing means and a second comparison generator means for continuously quantitatively comparing the output of said second function generator means and said other speed sensing means to provide a combined output from another of said pairs, and comparison generator means for continuously quantitatively comparing said combined outputs to directly control said fuel input, and said tailpipe nozzle control means further includes first comparison generator means for continuously quantitatively comparing the output of said manual operating means and one of said speed sensing means to provide a first combined output, first function generator means defining said desired predetermined relationship between said speeds and connected to the other of said speed sensing means to provide an output in terms of the output of said one speed sensing means and second comparison generator means for continuously quantitatively comparing the output of said second function generator means and said one speed sensing means to provide a second output, and third comparison generator means for continuously quantitatively comparing said first and second combined outputs to control directly the exhaust nozzle area of said turbine power plant.

References Cited in the file of this patent

UNITED STATES PATENTS

| | | |
|---|---|---|
| 2,545,856 | Orr | Mar. 20, 1951 |
| 2,580,962 | Sedille | Jan. 1, 1952 |
| 2,603,063 | Ray | July 15, 1952 |
| 2,785,848 | Lombard et al. | Mar. 19, 1957 |
| 2,807,138 | Torell | Sept. 24, 1957 |